(12) United States Patent
Simnioniw et al.

(10) Patent No.: US 9,908,792 B1
(45) Date of Patent: Mar. 6, 2018

(54) PORTABLE UNIT FOR TREATING POTABLE WATER IN MUNICIPAL AND SIMILAR WATER DISTRIBUTION SYSTEMS

(71) Applicant: Medora Environmental, Inc., Dickinson, ND (US)

(72) Inventors: Corey M. Simnioniw, Belfield, ND (US); Jonathan L. Zent, Dickinson, ND (US); Gary A. Kudrna, Dickinson, ND (US); Willard R. Tormaschy, Dickinson, ND (US); Joel J. Bleth, Dickinson, ND (US)

(73) Assignee: Medora Environmental, Inc., Dickinson, ND (US)

( * ) Notice: Subject to any disclaimer, the term of this patent is extended or adjusted under 35 U.S.C. 154(b) by 83 days.

(21) Appl. No.: 15/241,980

(22) Filed: Aug. 19, 2016

(51) Int. Cl.
| | |
|---|---|
| C02F 1/74 | (2006.01) |
| B01F 3/04 | (2006.01) |
| C02F 1/20 | (2006.01) |
| B01D 1/20 | (2006.01) |
| C02F 101/36 | (2006.01) |

(52) U.S. Cl.
CPC .............. C02F 1/20 (2013.01); B01D 1/20 (2013.01); B01F 3/04021 (2013.01); B01F 3/04099 (2013.01); C02F 1/74 (2013.01); C02F 2101/36 (2013.01); C02F 2209/003 (2013.01); C02F 2209/03 (2013.01); C02F 2209/40 (2013.01); C02F 2307/14 (2013.01)

(58) Field of Classification Search
CPC .......... C02F 1/74; B01F 3/04; B01F 3/04099; B01F 3/04241; B01F 3/04021
USPC .................. 261/76, 78.2, 108, 116
See application file for complete search history.

(56) References Cited

U.S. PATENT DOCUMENTS

| | | | |
|---|---|---|---|
| 3,653,182 A | 4/1972 | Welch | |
| 5,685,976 A * | 11/1997 | Lamarre | ............... C02F 1/20 |
| | | | 210/150 |
| 8,523,984 B2 | 9/2013 | Simnioniw | |
| 2014/0224747 A1 | 8/2014 | Simnioniw | |

* cited by examiner

Primary Examiner — Robert A Hopkins
(74) Attorney, Agent, or Firm — W. Scott Carson

(57) ABSTRACT

A portable unit for treating potable water in municipal and similar water lines to reduce and remove undesirable disinfectant byproducts such as trihalomethanes. The unit has a housing with water and air inlet and outlet arrangements. The water inlet arraignment is connectable to the municipal water line to deliver water into the housing where it is sprayed substantially horizontally into the housing along a duct through a splash screen and up against a splash plate. The splash plate redirects the water spray laterally outwardly, rearwardly, and downwardly onto an inclined ramp that guides the water downwardly into the lower part of the housing where it is collected or held until it is pumped back into the municipal water line. In operation, the THM treatment unit is self regulating based on fluctuating downstream water demand and beneficially operates in at least two modes automatically to meet the demand and safety considerations.

29 Claims, 10 Drawing Sheets

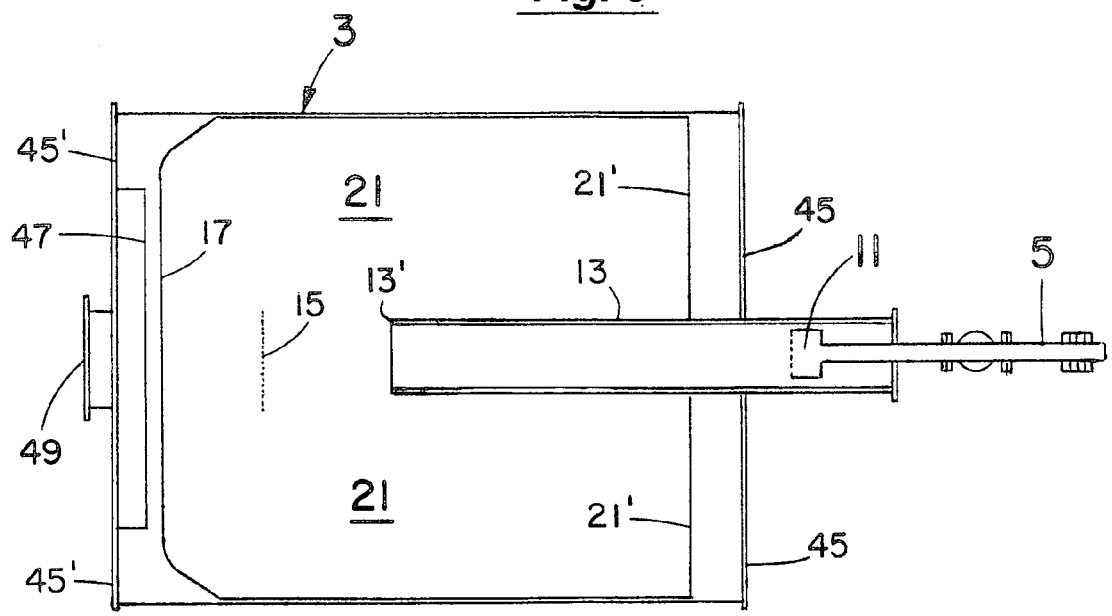
*Fig. 8*
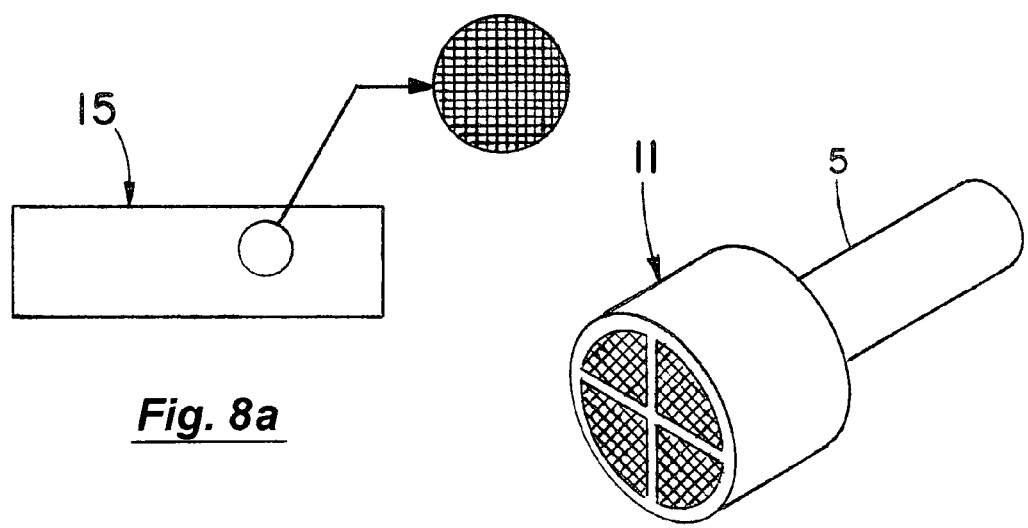
*Fig. 8a*
*Fig. 8b*

PORTABLE UNIT FOR TREATING POTABLE WATER IN MUNICIPAL AND SIMILAR WATER DISTRIBUTION SYSTEMS

BACKGROUND OF THE INVENTION

1. Field of the Invention

This invention relates to the field of systems for treating potable water in municipal and similar distribution lines to reduce and remove undesirable disinfectant byproducts from the water.

2. Discussion of the Background

Potable bodies of water and in particular municipal and other water sources intended for drinking are commonly treated with disinfectants such as chlorine and chloramines. These disinfectants very efficiently and effectively eliminate harmful agents in the water making the water potable and suitable for drinking. However, such disinfectants can and usually do create undesirable disinfectant byproducts such as chloroform, bromodichloromethane, dibromochloromethane, and bromoform which are all forms of trihalomethanes (THM). In very small amounts (e.g., very low parts per billion), these THM are not believed to be a serious threat to health but reduction of them in potable water tanks or reservoirs such as municipal water systems is always desirable and is increasingly being mandated by law.

An effective way of removing THM from treated water is by air stripping. The basic operation of air stripping is that upon contact with air, the THM in a liquid or aqueous state in the treated water will volatilize to a gaseous state and can then be removed with the air (i.e., stripped from the water) leaving the water safer to drink. The THM in this regard have a relatively high vapor pressure while having low aqueous solubility which enables such stripping methods to be effective. One such method involves bubbling air into a tank of water at various depths and letting the air bubbles contact and volatilize the THM which then rises to the surface with the air and into the atmosphere. Bubbling air into the tank water can be somewhat inefficient as it is often the case that the tank water needs to be passed several times through the bubbling or treatment zone to ensure adequate contact of the air with the THM in the water. Dead or uncirculating spots can also develop in the water in the tank that go untreated, particularly in a large tank (e.g., 20-35 feet high and 30-100 feet wide holding 150,000 to 2,000,000 or more gallons). The equipment and operational costs of such bubbling methods can also be relatively high particularly if the air is introduced near the bottom of the tank through air diffusers with a relatively large footprint. Such depths require that the air be raised to a relatively high pressure before it can be introduced into the water.

Another method of air stripping involves spraying or atomizing the water held in the tank into the headspace or air gap region between the surface of the tank water and the ceiling of the tank. This method requires that great quantities of fresh air be constantly circulated through the headspace and often requires powered blowers to do it. Otherwise, the fresh air volume may be insufficient for thorough treatment and the air in the tank may actually become saturated with THM that may then undesirably condense and return to the water. The process of volatilizing the THM by air contact also consumes heat from the air and water and if the ambient air flow is not sufficiently refreshed, the temperature of the air and water in the tank may drop to the point that the efficiency and effectiveness of the THM volatilization process may also significantly drop Further, in large as well as small tanks, the problem still can exist that dead or uncirculating spots can develop in the water in the tank that go untreated. The same water may then end up being treated over and over again while much is missed. Additionally and unless there is a very efficient and effective circulation in the tank, water entering it may end up leaving it and being put into the municipal distribution system without being treated. The same is true for the bubbling method discussed above.

With this and other problems in mind, the present invention was developed. In it, a treatment unit is provided that has been specifically designed to be portable and deployable (e.g., plumbed) wherever needed or desirable along a municipal or similar water line to treat and remove undesirable disinfectant byproducts such as THM in the water. Such deployment can be as a result of any number of situations where higher than desirable levels of such byproducts may exist or be detected in the water line. Such occurrences can result for example from a less than complete removal of the THM in the upstream, main treatment tank(s) or as a result of a boost or secondary treatment of the water with disinfectant (e.g., chlorine) downstream of the main treatment tank(s) that may be needed or desirable in areas along the distribution line. The unit of the present invention also effectively treats virtually all of the water passing through it and avoids the need to have an internal circulation system to ensure complete treatment of all of the incoming water.

SUMMARY OF THE INVENTION

This invention involves a portable unit for treating potable water in municipal and similar water lines to reduce and remove undesirable disinfectant byproducts such as trihalomethanes from the water. The unit has a housing with water and air inlet and outlet arrangements. The water inlet arraignment includes a pipe section connectable to the municipal water line at a first upstream location to deliver water from the line into the housing. The incoming water laden with THM in liquid state is then sprayed substantially horizontally into the main body of the housing through at least one nozzle along a duct or chamber through a perforated splash screen and up against a splash plate. The splash plate subsequently diverts or redirects the water spray laterally outwardly, backwardly, and downwardly onto an inclined ramp. The inclined ramp then guides and directs the water downwardly into the lower part of the housing where it is collected or held until it is pumped back into the municipal water line.

The air inlet arrangement of the housing includes a filter through which ambient air is drawn into the duct or chamber by the nozzle spray and mixes with the sprayed water as it travels along the duct through the splash screen to strike and be diverted by the splash plate onto the inclined ramp. As the air contacts and mixes with the sprayed water, it volatizes the THM in liquid state in the water into a gaseous state. The mixed air and gaseous THM are then driven out of the housing through a discharge duct or vent into the ambient air surrounding the housing. In an efficient manner, the driving force to draw the air into the housing and drive the mixed air and gaseous THM out of the housing is completely provided by the water pressure in the municipal water line.

In operation, the treatment unit of the present invention is self regulating and beneficially operates in at least two modes automatically. In a first mode, substantially all of the flow in the upstream municipal water line passes through the housing to be treated. This will occur when the fluctuating flow rate in the municipal pipeline is substantially equal to or less than the discharge rate of the unit's pumping arrangement. Virtually all of the pipeline water then passes through the housing and is treated. In a second or safety mode such as when an emergency (e.g., fire) may exist downstream of the unit and the need or demand for water exceeds the treatment capacity of the unit, the operation is modified. More specifically and in the second mode, the unit continues to treat water up to its capacity but the remaining portion of the pipeline water exceeding this capacity bypasses the unit and goes directly downstream. The treatment unit then presents no impediment to the safe delivery of the maximum amount of water downstream to fight the fire or meet some other emergency or need. Whether the treatment unit is operated in its first or second mode is then automatically determined by the flow rate in the municipal pipeline as determined by the fluctuating downstream demand.

BRIEF DESCRIPTION OF THE DRAWINGS

FIG. 7a is an enlarged view of the encircled area of FIG. 7.

FIG. 8 is a planar view of the interior of the housing of the treatment unit showing the relative positioning of some of its working elements.

FIG. 8a is an enlarged view of the splash screen positioned in the interior of the housing of FIG. 8.

FIG. 8b is an enlarged view of the spray nozzle positioned in the interior of the housing of FIG. 8.

DETAILED DESCRIPTION OF THE INVENTION

The portable treatment unit or apparatus 1 of the present invention is shown in the exterior views of FIGS. 1-5. The unit 1 is designed to treat and remove undesirable disinfectant byproducts from the potable water in municipal and other water distribution systems. Such undesirable byproducts as discussed above include trihalomethanes (THM) and similar byproducts of disinfecting processes, particularly those processes using chlorine and chloramines which routinely result in undesirable concentrations of THM in liquid state remaining in the processed water. The unit 1 is specifically designed to be relatively small (e.g., 8×8×16 feet and 12,000 pounds) so it can be portable and deployable (e.g., plumbed) wherever needed or desirable along the municipal water distribution system.

Figure 6:
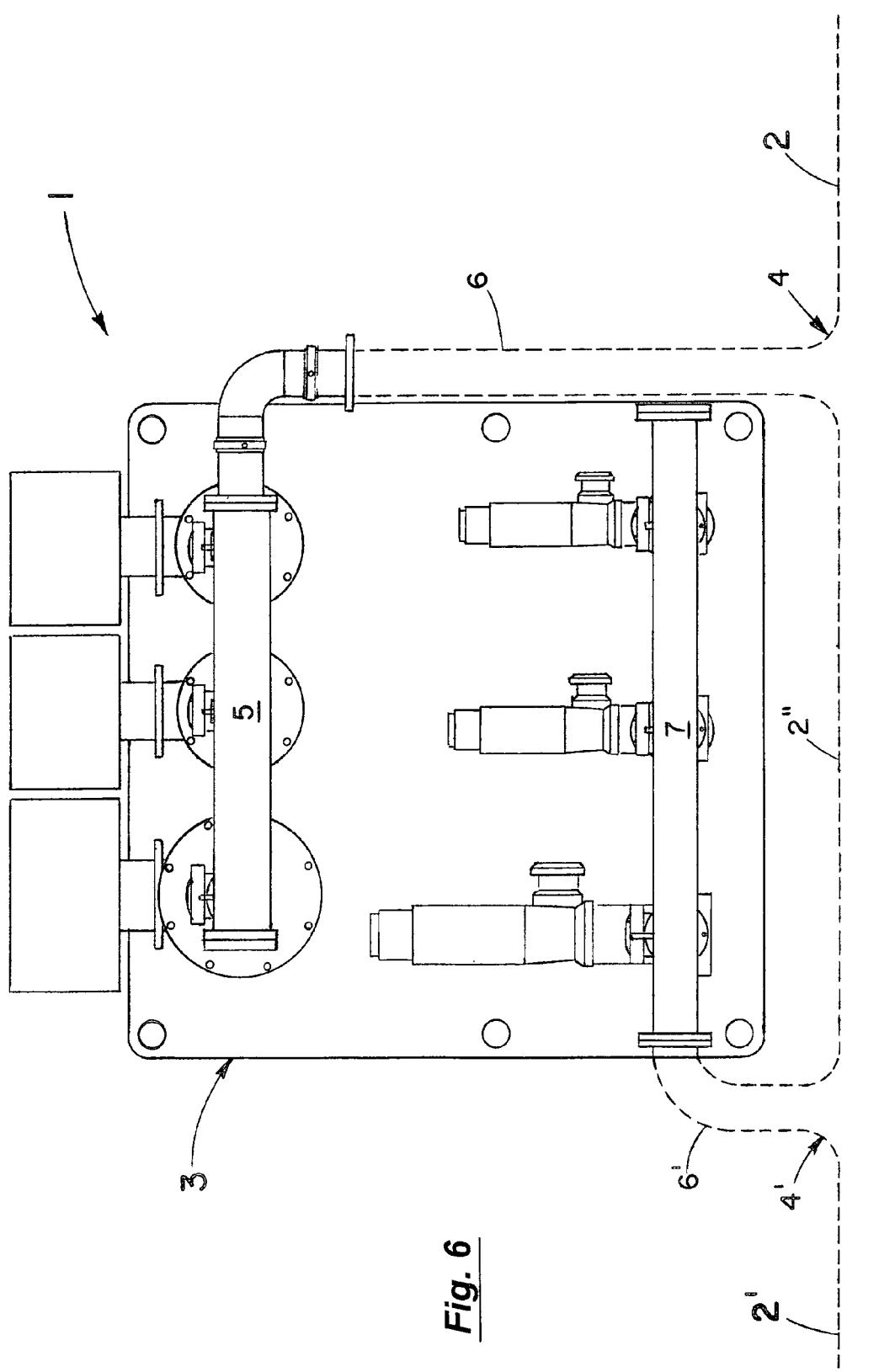
FIG. 6 is an enlarged view of FIG. 2 showing the hook up to the municipal water distribution system in dotted lines.

The unit 1 includes the exterior housing 3 of FIGS. 1-5 with water and air inlet and outlet arrangements. Part of the water inlet arrangement of the housing 3 includes the pipe section 5 in FIGS. 1-6. The pipe section 5 as shown in FIG. 6 is connectable to the incoming municipal or other water line 2 at an upstream location 4 (e.g., by connecting pipe section 6). As explained in more detail below, municipal water in pipeline 2 is then diverted at the upstream location 4 in FIG. 6 up the pipe section 6 and through the pipe section 5 of the water inlet arrangement into the housing 3 to be treated. Once treated within the housing 3 as also explained in more detail below, the treated water is returned to the municipal pipeline 2' at downstream location 4' in FIG. 6 by the water outlet arrangement of the housing 3. The water outlet arrangement in this regard includes the pipe section 7 in FIG. 6 connectable (e.g., by pipe section 6') back to the municipal pipeline 2' at location 4'. In the preferred mode of operation as discussed below, the flow from the pipeline 2 at the upstream location 4 through the housing 3 and back to the pipeline 2' at the downstream location 4' bypasses the open pipeline section 2" of FIG. 6 that extends between pipelines 2 and 2'.

Figure 7:
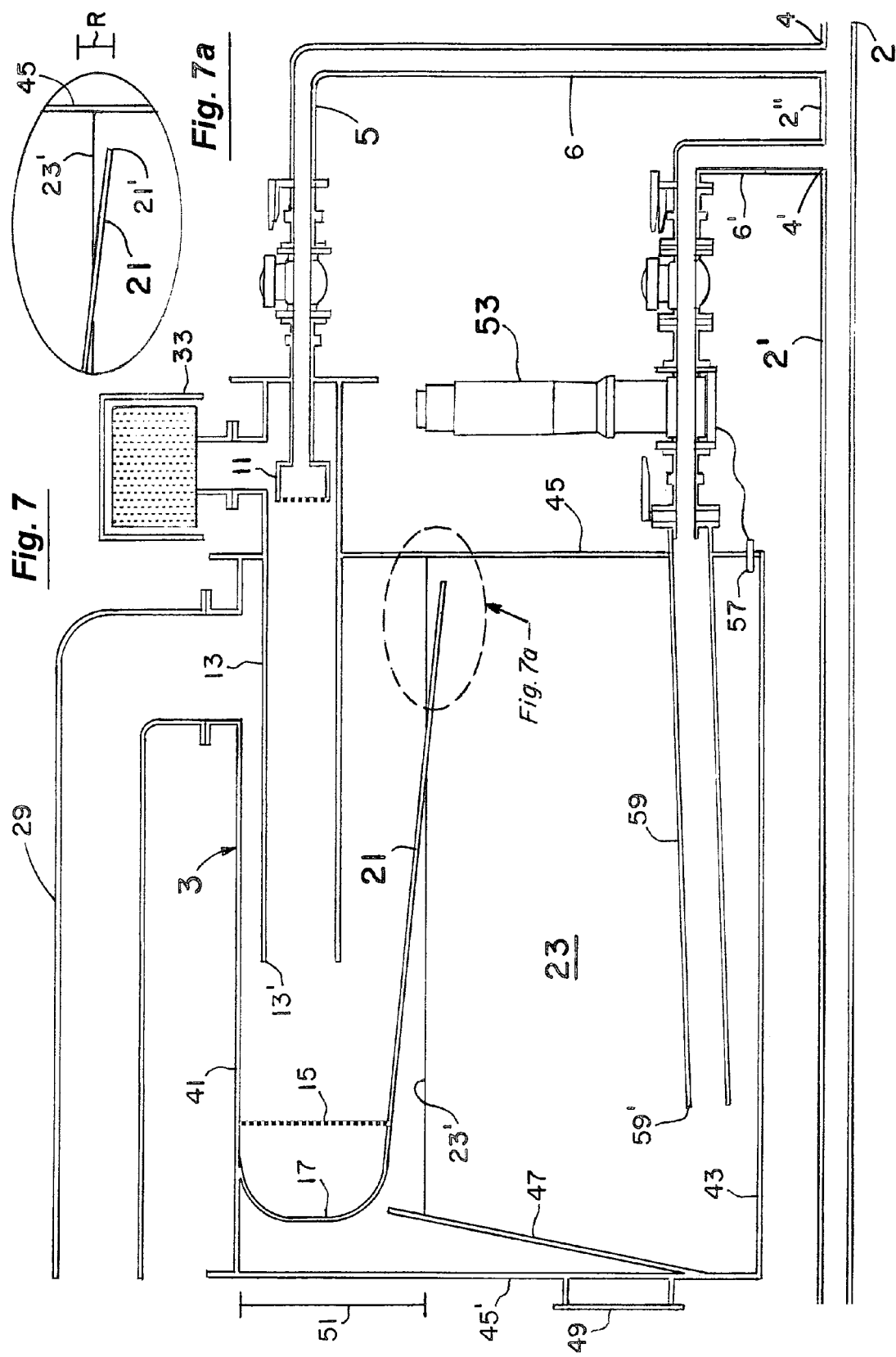
FIG. 7 is a cross-sectional view of the basic elements of the treatment unit of the present invention.
Figure 9:
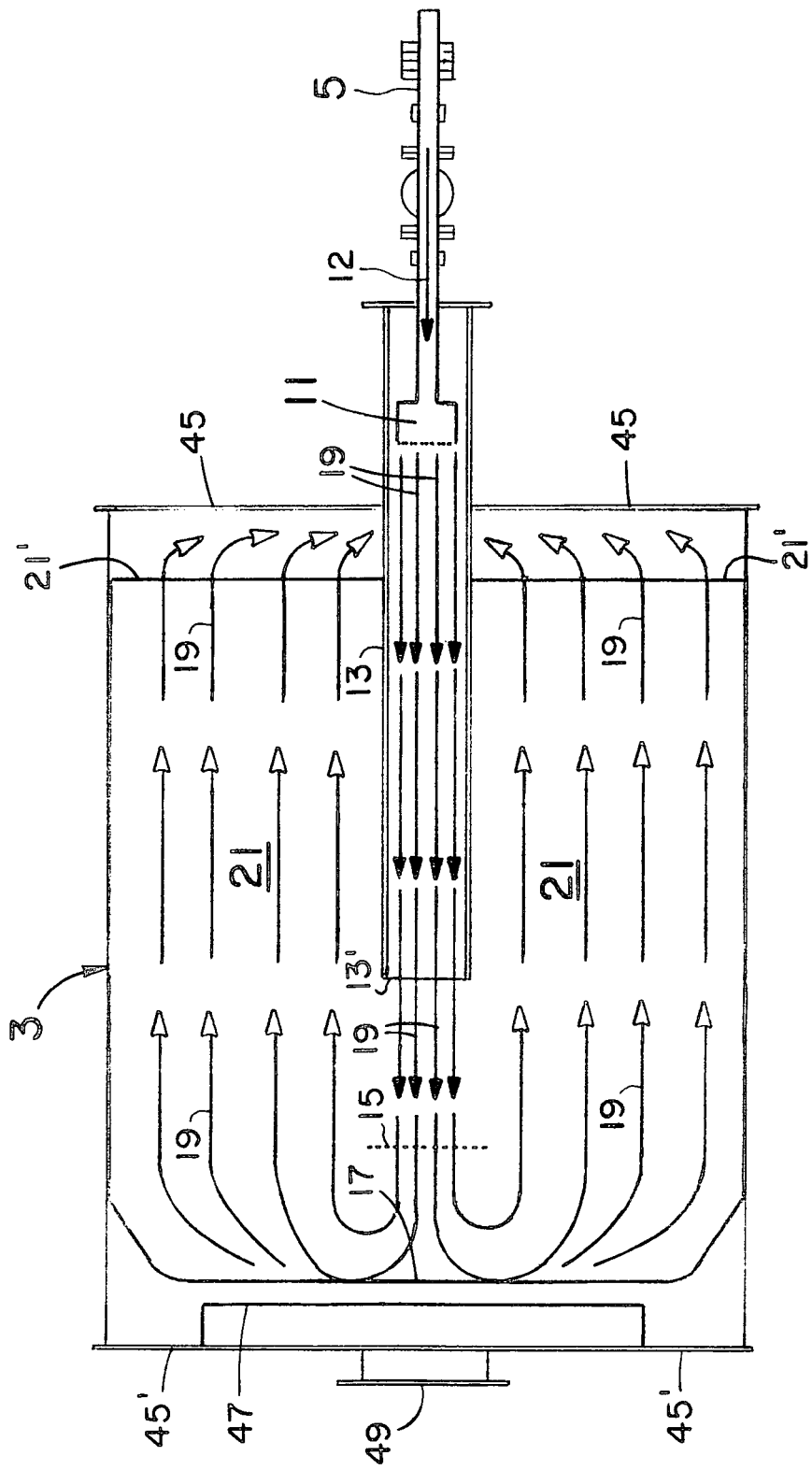
FIG. 9 is a view similar to FIG. 8 and showing part of the water travel path through the interior of the housing.
Figure 10:
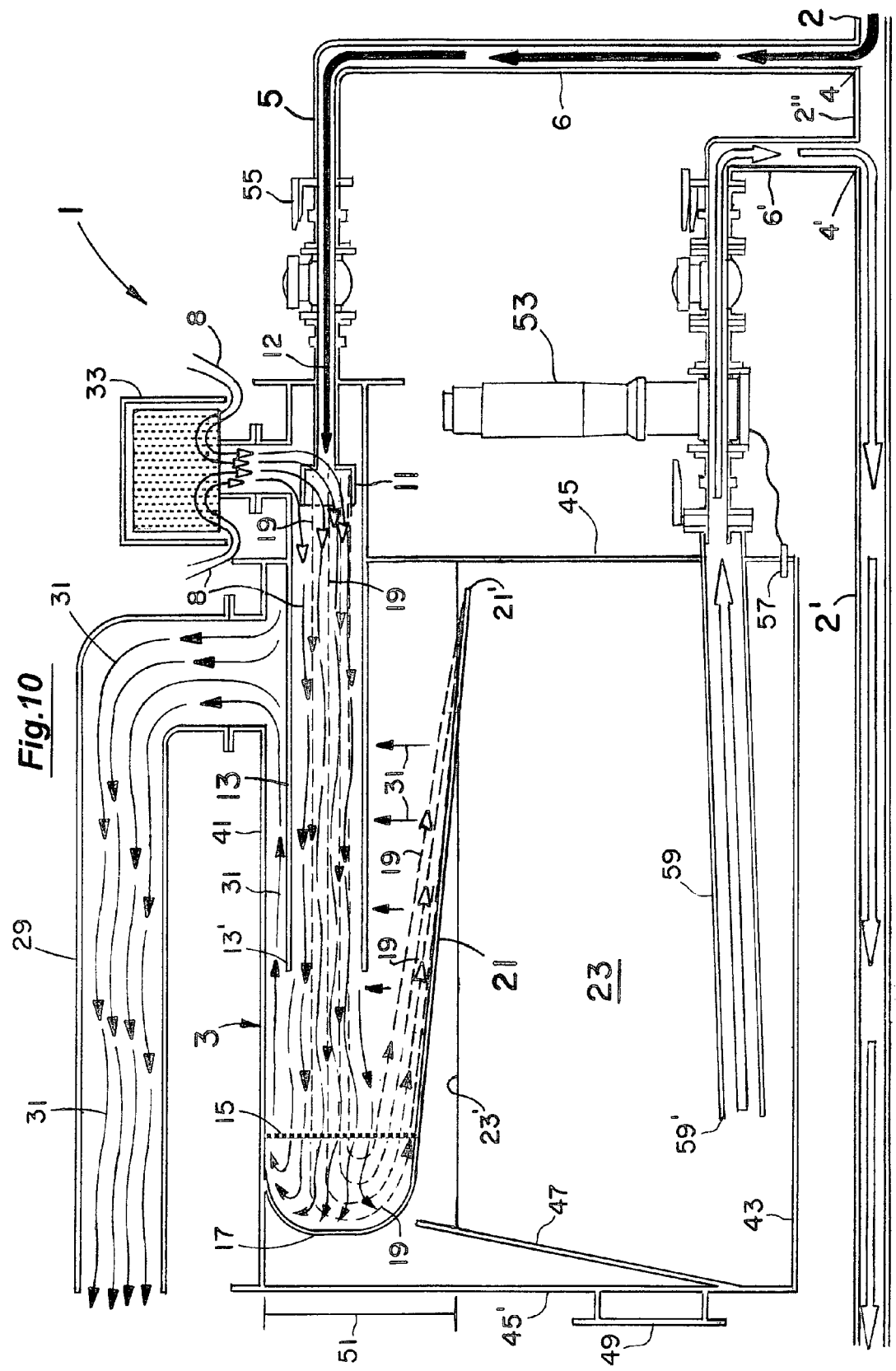
FIG. 10 is a view similar to FIG. 7 showing the air and water travel paths through the interior of the housing and the overall operation of the treatment unit.

The water inlet arrangement of the housing 3 as schematically shown in FIG. 7 includes the pipe section 5 of FIGS. 1-6 connected as by pipe section 6 in FIG. 7 to the municipal water line 2 at the upstream location 4. The water inlet arrangement of the housing 3 further includes at least one spray nozzle 11 (see also FIGS. 8-9). The spray nozzle 11 directs the incoming water 12 (FIGS. 9-10) from the pipe section 5 substantially horizontally (FIG. 10) along a duct or chamber 13 (FIGS. 7-10) through a splash screen 15 and up against a splash plate 17. The curved or concave splash plate 17 as best seen in FIGS. 9 and 10 diverts or redirects the water spray 19 laterally outwardly and backwardly (FIG. 9) and downwardly (FIG. 10) onto a downwardly inclined ramp 21. The downwardly inclined ramp 21 (e.g., 10-15 degrees from the horizontal) guides and directs the water into the lower part of the housing 3 (FIGS. 7-10) where the water is collected at 23 in FIGS. 7 and 10.

The main purpose of the portable unit 1 as discussed above is to treat the incoming water from the municipal pipe line 2 and remove undesirable disinfectant byproducts such trihalomethanes (THM) from the water. To accomplish this, the housing 3 of the treatment unit 1 is provided with an air inlet arrangement to mix ambient air 8 in FIG. 10 into the incoming sprayed water 19 from 12 laden with THM in liquid state (as generally represented by the black arrows and arrowheads in the incoming water 12 and 19 in FIG. 10) to volatize the THM from a liquid state to a gaseous state. Once so treated, the mixed air and gaseous THM 31 in FIG. 10 (as generally represented by the black arrowheads on 31) are then discharged through the discharge duct or vent 29 of the air outlet arrangement of the housing 3 into the ambient air surrounding the housing 3. The air inlet arrangement of the housing 3 further includes the air filter at 33 in FIGS. 7 and 10 through which the ambient air 8 (FIG. 10) surrounding the housing 3 is drawn into the incoming water about the spray nozzle 11. The drawn-in air 8 through the portion of the air inlet arrangement that includes the air filter 33 then contacts and mixes with the sprayed water 19 as mentioned above. This mixing occurs as the sprayed water 19 travels as in FIGS. 9-10 through the duct or chamber 13 and splash screen 15 to strike and be diverted by the splash plate 17 onto the inclined ramp 21 and into the collected water at 23 in FIG. 10. In doing so as also discussed above, the THM in liquid state in the incoming sprayed water 19 in the housing 3 is contacted and volatized to a gaseous state.

To aid in this process, the splash screen 15 (see FIG. 8a) is preferably perforated with very small holes (e.g., 0.015 inch diameters and spaced $3/16^{th}$ to half an inch from each other). The small perforations then assist in transforming the incoming sprayed water 19 from streamlines from the nozzle 11 to droplets and finally to a mist for maximum exposure and mixing of the THM laden water with the incoming ambient air 8. It is noted that the spray from the nozzle 11 that draws in the ambient air 8 in FIG. 10 also serves to drive the mixed air and THM in gaseous state 31 out of the housing 3 through the air outlet duct portion 29 and does so to create a continuous flow of air through the housing 3. It is further noted in this last regard that all of the sole driving or motive force to drive the incoming water 12 through the spray nozzle 11, to draw the ambient air 8 into the housing 3, and to drive the mixed air and gaseous THM 31 out of the housing 3 is completely provided in the preferred embodiment by the water pressure in the incoming municipal water line 2.

The housing 3 as illustrated in FIGS. 7 and 10 has a ceiling 41, floor 43, and side wall portion 45,45' extending substantially about a central vertical axis between the ceiling 41 and floor 43. The treated water is then collected or held at 23 in the housing 3 and an air gap or headspace region 51 (e.g., 8 feet wide by 10 feet long by 2 feet high) is created between the ceiling 41 and the surface 23' of the collected water 23 therebelow. It is then in this air gap region 51 that the treatment of the incoming water laden with THM in liquid state occurs to volatize the liquid THM into a gaseous state. Both the air inlet and outlet arrangements of the housing 3 have portions positioned above the surface 23' of the collected water 23 in FIGS. 7 and 10. Both the air inlet and outlet arrangements are also in fluid communication with the air gap region 51 and each other above surface 23' of the collected water 23 and additionally in fluid communication with the ambient air surrounding the housing 3.

Primarily for safety purposes, the open and upwardly inclined sheet 47 and drain 49 on the left in FIGS. 7 and 10 are provided to meet any unexpected water problems that might occur (e.g., the electrical power to the discharge pump 53 fails) and the housing 3 begins to fill up with water. Once any water buildup exceeds the height of the sheet 47, it will then safely pass over the sheet 47 and be discharged through the drain 49. The drain 49 can also be used if desired in normal operation of the treatment unit 1 as a second discharge route for the mixed air and gaseous THM in addition to the main discharge route through duct or vent 29. Additional safety mechanisms such as float switches can also be used if desired to detect undesirably high water levels in the housing 3 and to control the operation of the unit 1 including its nozzles 11 accordingly.

The water outlet arrangement of the housing 3 further includes at least one pump 53 in FIGS. 7 and 10. The pump 53 serves to discharge the collected and treated water 23 in the main body of the housing 3 back into the municipal pipeline 2' at the downstream location 4'. The pump 53 is preferably a centrifugal pump equipped with a variable frequency drive (VFD) that is controlled by a pressure transducer or sensor 57 in FIGS. 7 and 10. The pump 53 is carefully operated in order to maintain the depth (e.g., 6 feet) of the collected water 23 in the housing 3 within a very short range R (e.g., plus or minus 1 inch) as illustrated in FIG. 7a. In this manner, the discharge back into the municipal pipeline 2' will be closely matched to the incoming flow rate of the spray nozzle 11 in FIGS. 7 and 10. The discharge pressure of the pump needs just to be greater and really only slightly greater (e.g., 60.2 psi) than the municipal water line pressure (e.g., 60 psi).

In operation, the treatment unit or apparatus 1 is self-regulating and beneficially operates in at least two modes automatically. In a first mode, substantially all of the flow in the upstream municipal water line 2 in FIG. 10 passes from the upstream, first location 4 of the pipeline 2 to the downstream, second location 4' of the pipeline 2' through the housing 3 to be treated. This will occur when the fluctuating flow rate in the pipeline 2 upstream of the first location 4 is substantially equal to or less than the discharge rate of the pump 53. Virtually all of the pipeline water in 2 then passes through the housing 3 and is treated. In a second or safety mode such as when an emergency (e.g., fire) may exist downstream of the discharge location 4' and pipeline 2' and the need or demand for water exceeds the treatment capacity of the housing 3, the operation is modified. More specifically and in the second mode, the housing 3 continues to treat water up to its capacity but the remaining portion of the pipeline water exceeding this capacity passes directly from the upstream location 4 through the open bypass section 2" to the second location 4' and on downstream. The housing 3 then presents no impediment to the safe delivery of the maximum amount of water downstream to fight the fire or meet some other emergency or need. Whether the treatment unit 1 is operated in the first or second mode is then automatically determined by the flow rate in the pipeline 2 which in turn is determined by the demand rate downstream of the pipeline 2'.

The relative length and location of the open bypass section 2" can vary as desired as illustrated in a comparison of FIGS. 6 and 7. Also and in the first mode of operation, substantially all of the pipeline water upstream of location 4 passes through the housing 3 and is treated at least once before being discharged into the pipeline 2'. This is the case as discussed above when the discharge flow rate of the pump 53 essentially matches or is less than the downstream demand. It is noted that when the downstream demand is significantly less than the discharge flow rate of the pump 53, the difference is usually recycled through the bypass section 2" from the second location 4' back to the first location 4 and back into the housing 3 where it is simply treated again.

Figure 1:
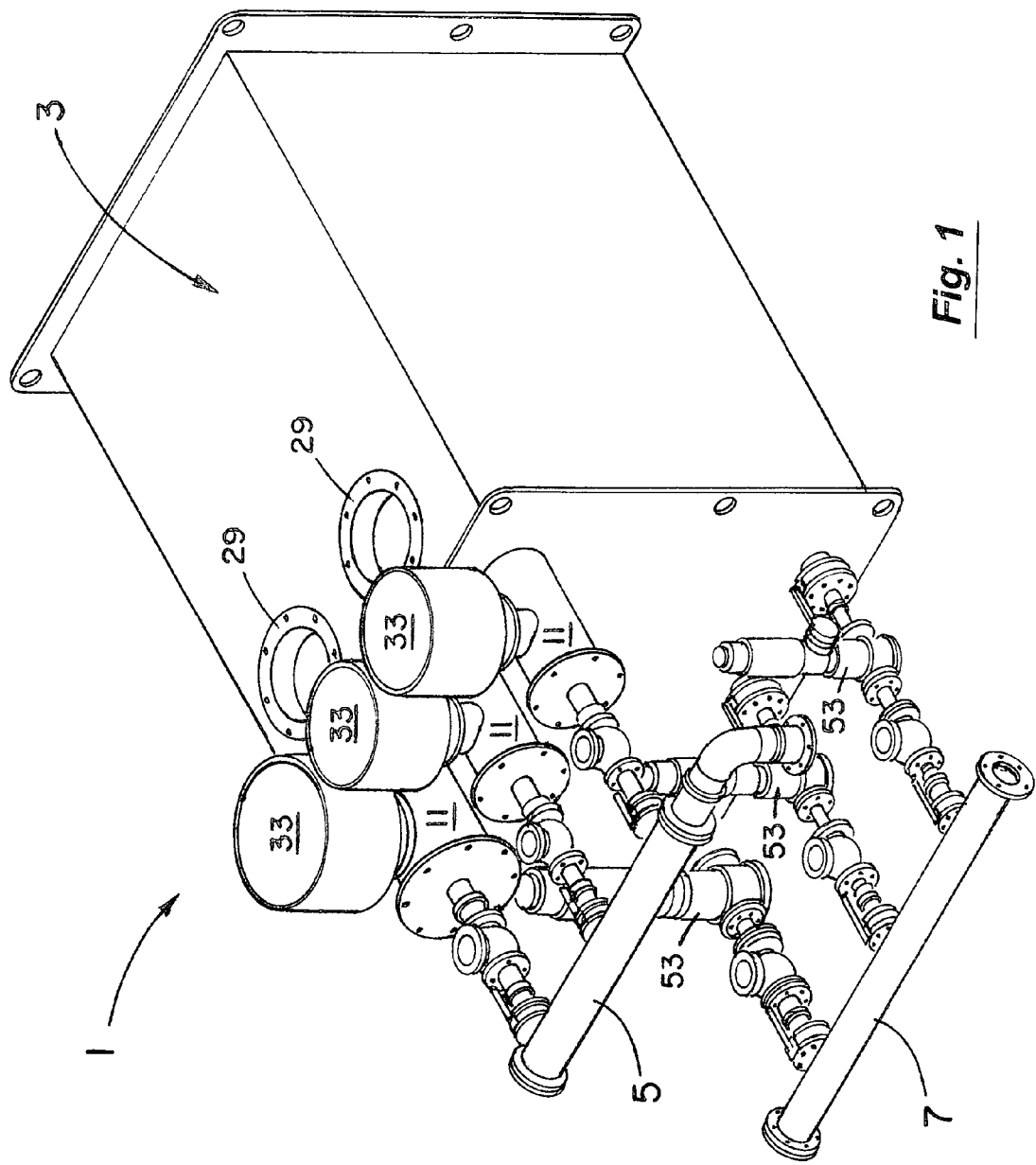
FIG. 1 is a perspective view of the portable treatment unit of the present invention.
Figure 2:
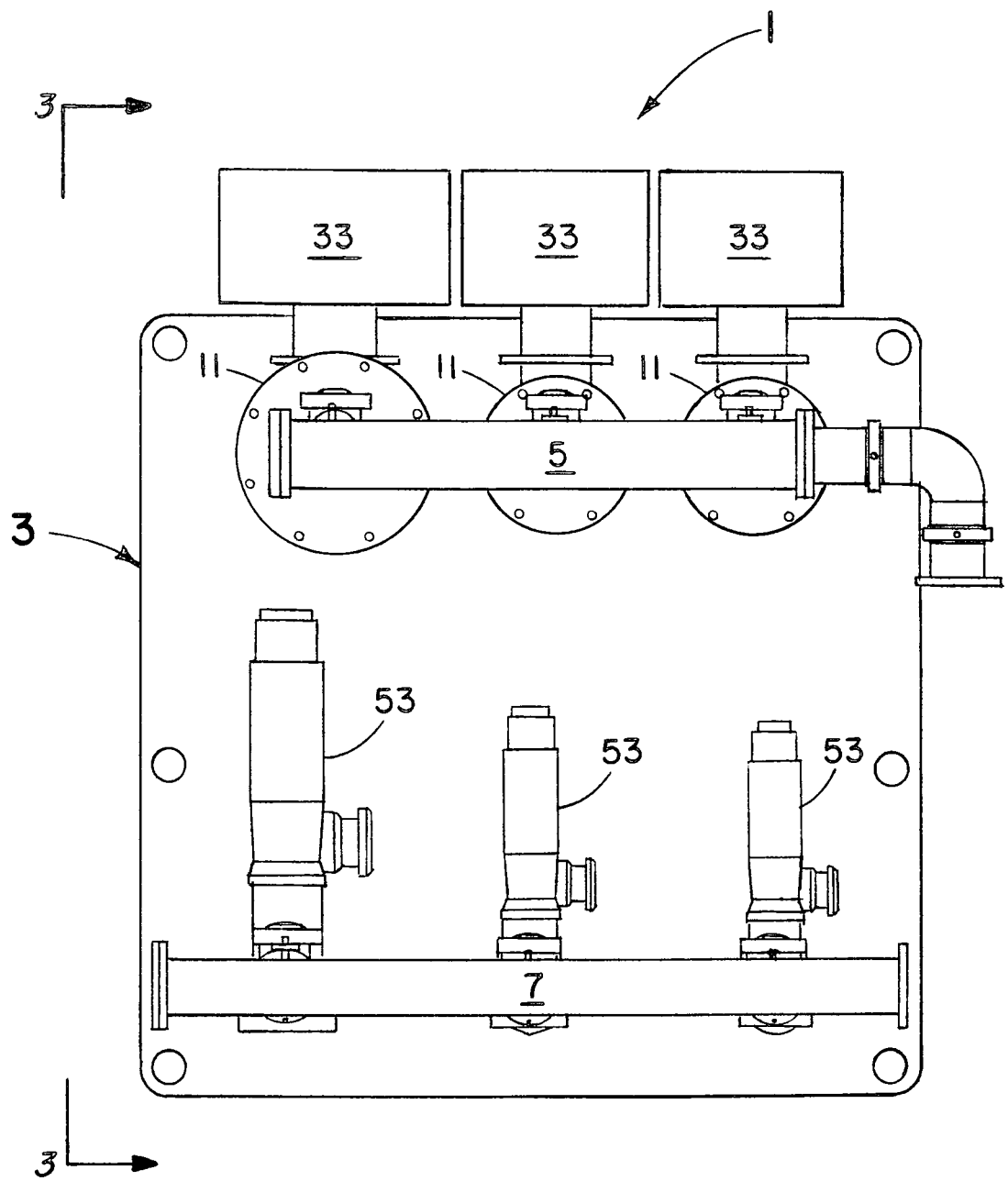
FIG. 2 is a front elevational view thereof.
Figure 3:
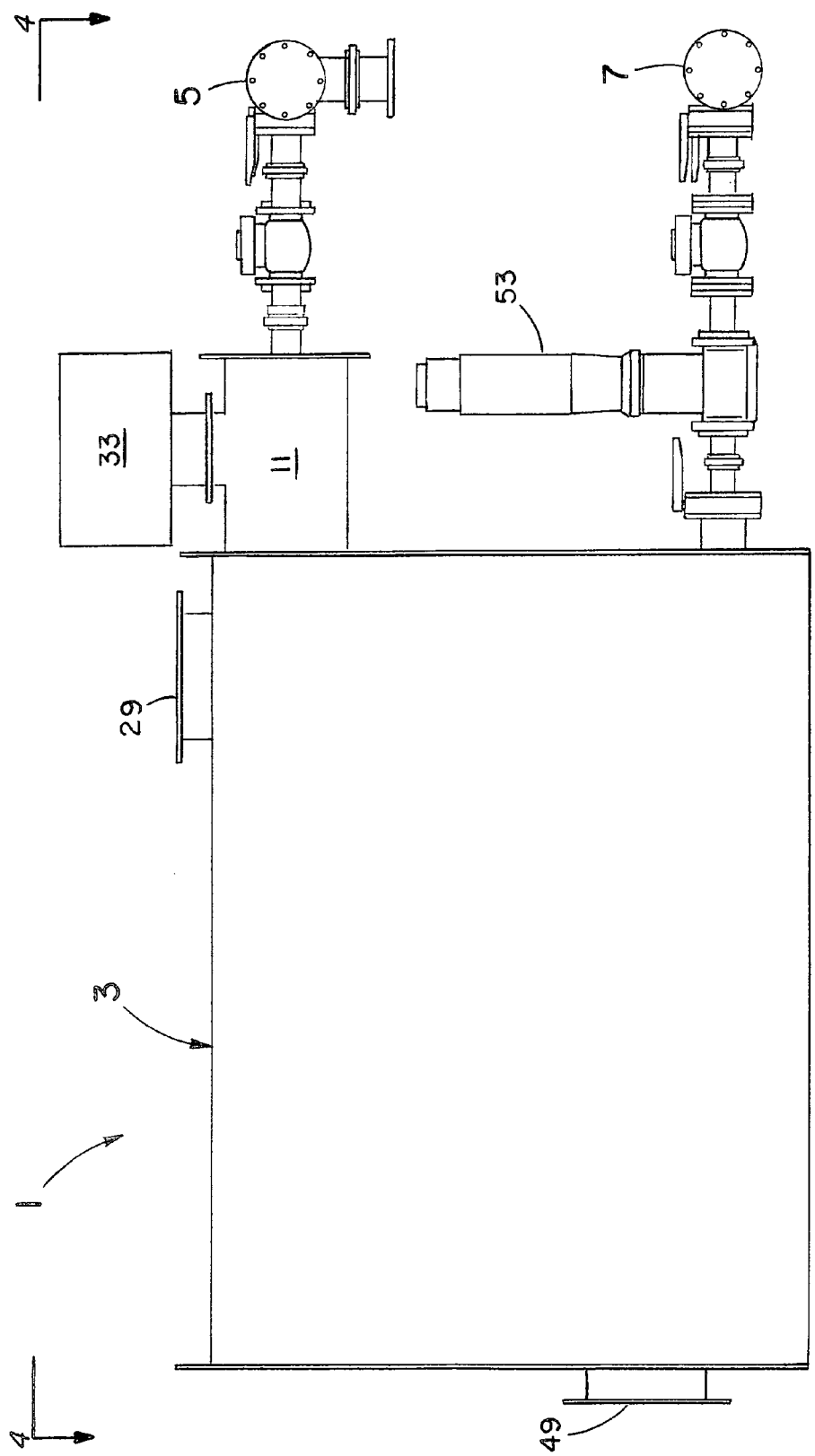
FIG. 3 is a left side view thereof taken along line 3-3 of FIG. 2.
Figure 4:
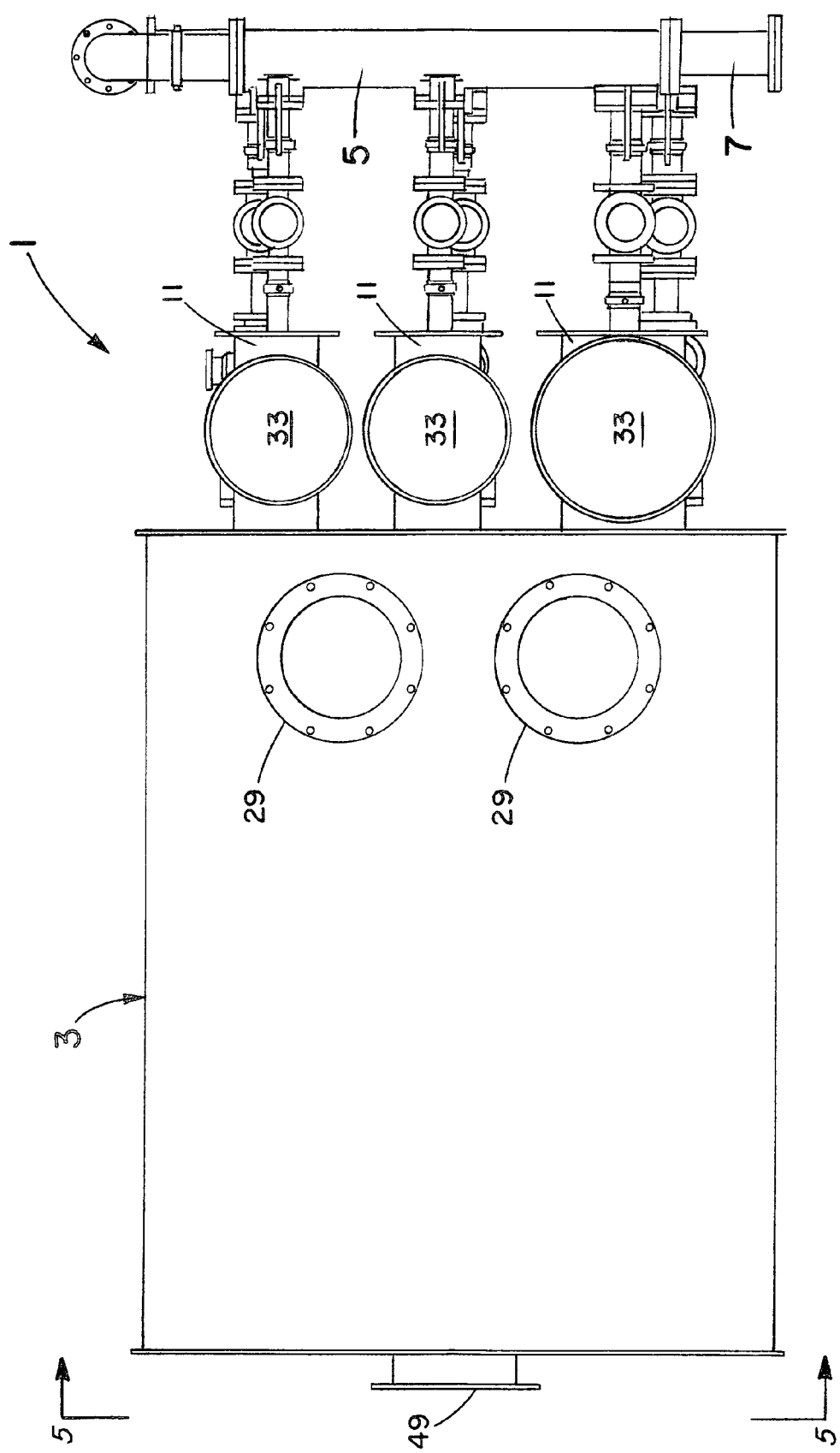
FIG. 4 is a top plan view thereof taken along line 4-4 of FIG. 3.
Figure 5:
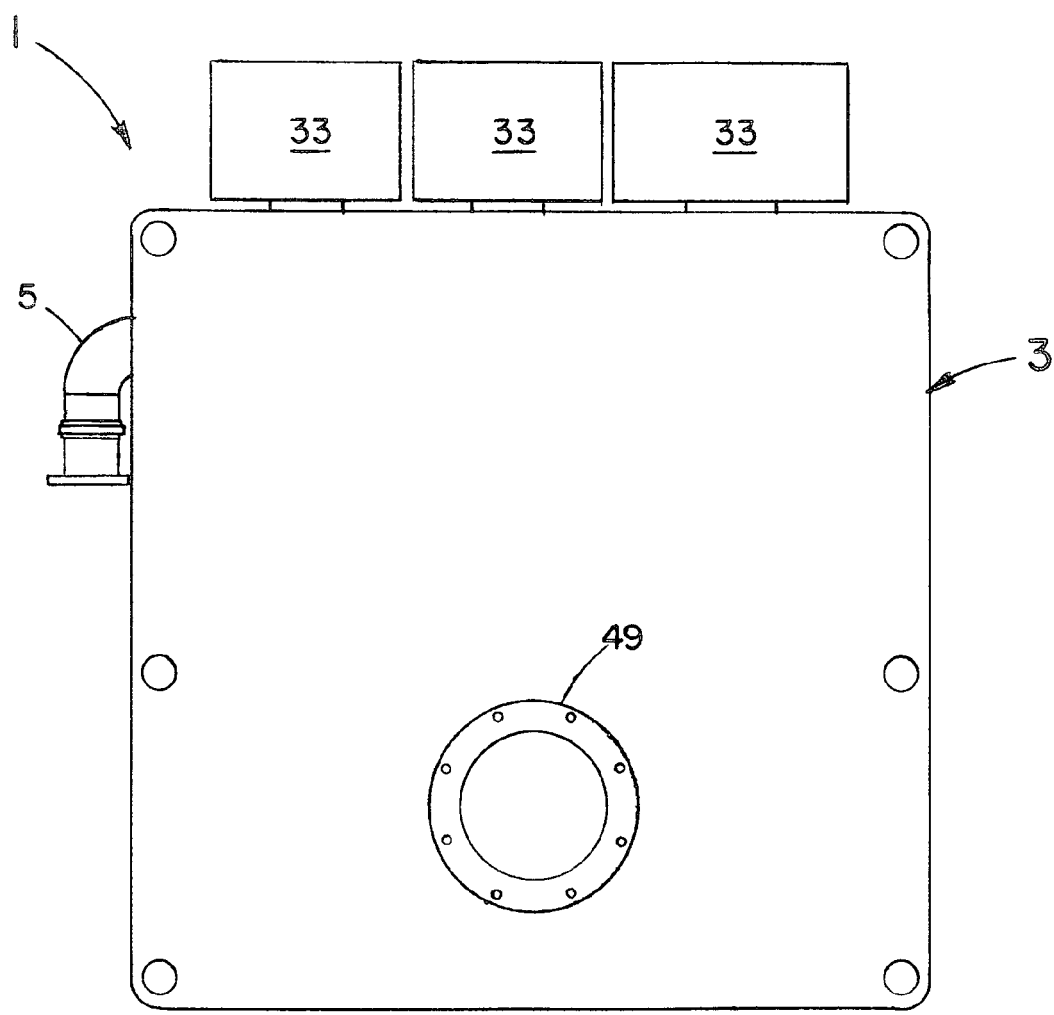
FIG. 5 is a rear elevational view thereof taken along line 5-5 of FIG. 4.

Although the pressure in most municipal pipelines like 2,2' is normally fairly constant (e.g., 60 psi above atmospheric plus or minus 5 psi), the flow rate through the municipal line typically can fluctuate widely during the day and seasonally depending upon the downstream demand. For instance, it is common to see daily peak demands between 5-9 am in the morning and 5-9 pm in the evening. It is also common to see higher demand in the summer and fall when conditions can be hot and dry versus the winter and spring with cooler and wetter weather. To meet these fluctuating demands, the treatment unit 1 is preferably provided with a plurality of spray nozzles 11 (e.g., three as illustrated in FIGS. 1 and 2) with varying capacities or discharge flow rates (e.g., 50 gallons/minute, 150 gallons/minute, and 300 gallons/minute). Similarly, the unit 1 is preferable provided with a corresponding plurality of discharge pumps 53 (e.g., three) as in FIGS. 1-2 to handle and coordinate with the number and capacity of the spray nozzles 11 being used. Depending upon the downstream demand, this could be for example one, two, or three of the spray nozzles 11 or various combinations of them.

In this manner, the operation of the unit 1 and its various components (e.g., control valve 55 upstream of the spray nozzle 11 in FIG. 10) can be timed or tied (e.g., electronically) to the demand so that only as much of the unit 1 and its components are used as needed to conserve power consumption and extend the life of the unit 1. Regardless of the number of spray nozzles 11 being used, the operation of the pump or pumps 53 are respectively and preferably controlled by pressure transducers or sensors 57 (see FIGS. 7 and 10) to substantially match the single or various combinations of discharge flow rates from the respective spray nozzles 11. This is done in order to maintain the depth of the collected water 23 in the housing 3 at the desired, substantially constant depth (e.g., 6 feet plus or minus 1 inch).

In this regard as discussed above, the collected water 23 is maintained at a desired depth (e.g., 6 feet) in an effort to allow as much remaining air as possible in the collected water 23 to be released and travel upwardly to the water surface 23'. Upon reaching the surface 23', the released air is then discharged through the discharge duct or vent 29 of the air outlet arrangement. Air in this regard is very undesirable in the collected water 23 to be discharged back into the municipal pipe line 2' as it can cause undesirable problems (e.g., cavitation, air plugs, and water hammer) in the pump(s) 53 and pipeline 2'. The collected water 23 (e.g., 6 feet high by 8 feet wide by 10 long or about 3500 gallons) is then primarily maintained at the substantially constant depth (e.g., 6 feet) to allow more time (e.g., 5 minutes) for any undesirable air in the collected water 23 to be released. However, it also provides even more opportunity for any remaining liquid THM in the collected water 23 to be contacted by the rising air and volatized and discharged with the rising air through the discharge duct or vent 29.

In a related design feature of the unit 1, the discharge end 21' of the inclined ramp 21 of FIGS. 7, 7a, and 10 is preferably always kept below the surface 23' of the collected water 23 (FIG. 7a). As illustrated in FIG. 7a, the preferred water level 23' of the collected water 23 is for example one inch above the discharge end 21' of the ramp 21. This level of the water surface 23' in FIGS. 7, 7a, and 10 would then for example be at the desired 6 feet depth of the collected water 23. The maintaining of this water depth plus or minus one inch as discussed above would then always keep the discharge end 21' of the ramp 21 at or below the surface 23' of the collected water 23 (FIG. 7a). In this manner, the damped water flow down the ramp 21 does not fall or cascade into the collected water 23 which may undesirably add or entrain air into the discharging water from the ramp 21 and may unnecessarily churn up the collected water 23 and further induce air to undesirably enter the collected water 23.

These features are all part of the overall design of the treatment unit or apparatus 1 of the present invention to put as much air as possible into the sprayed water for maximum volatization of the liquid THM and then to take out as much air as possible from the water before returning the water to the municipal pipeline 2' to avoid problems like cavitation. The air induced by each spray nozzle 11 is on the order of 100:1 (15,000 gallons of air by volume/minute for a spray nozzle with a discharge flow rate of 150 gallons/minute). The air volume being handled is then quite large for the relatively small size of the housing 3 (e.g., 8×8×10 feet) of the unit 1 and in particular the air gap region 51 (e.g., 2×8×10 feet or about 1200 gallons by volume of air space).

The serpentine or C-shaped water path of 19 as in FIG. 10 further serves these purposes. The serpentine or C-shaped water path in this regard effectively doubles the length of the water travel through the housing 3 along a first path from the spray nozzle 11 near the first wall section 45 on the right in FIG. 10 through the duct or chamber 13 to the splash plate 17 near the opposite wall portion 45' on the left side of FIG. 10. The water then travels back along a second, substantially opposite path (see also FIG. 9) toward and nearly back to the wall section 45 down the inclined ramp 21 into the collected water 23. The spacing of the end location 13' of the duct 13 from the splash plate 17 allows for the spray striking the splash plate 17 to be directed as shown along the second path outside of the duct 13. The distance of the water travel within the housing 3 is even further lengthened by the placement of the inlet or entrance 59' (see FIGS. 7 and 10) to the upwardly inclined (e.g., 5-10 degrees) inlet pipe 59 to the discharge pump 53. The entrance 59' in this regard as shown is placed near the floor 43 of the housing 3 and adjacent the opposite wall portion 45' on the left side in FIG. 10. The inlet or entrance 59' is then also on the opposite side from the discharge end 21' of the ramp 21. To the extent air may become trapped in the upwardly inclined inlet pipe 59, a vent or air hole can be provided near or at the highest point of the inlet pipe 59 within the housing 3. Also, the inlet pipe 59 if desired could extend horizontally or even be inclined downwardly (e.g., 5-10 degrees to the horizontal) if desired.

Similarly, the location of the entrance of the air outlet portion of the discharge duct or vent 29 in FIGS. 7 and 10 is spaced rearwardly of the end location 13' of the duct or chamber 13. This in effect serves to nearly double the length of the air travel through the housing 3. That is, the duct or chamber 13 surrounds and contains or guides the spray 19 from the nozzle 11. The duct 13 also surrounds and contains or guides the ambient air 8 being induced into the duct 13 by the spray nozzle 11 adjacent the first wall portion 45 on the right side in FIG. 10. The induced air 8 then travels and mixes with the sprayed water 19 along a first path within the duct 13 to its end 13' and on to strike the splash plate 17 adjacent the second wall portion 45' on the left side of FIG. 10. Upon striking the splash plate 17, the air and water are both redirected outwardly and rearwardly on a second path substantially opposite the first path along and outside of the duct 13 back toward the first wall portion 45. The water subsequently ends up going down the inclined ramp 21 to its discharge end 21' adjacent the first wall portion 45 and the air and gaseous THM flow into the entrance of the discharge duct or vent 29 also near the first wall portion 45 and out into the ambient air surrounding the housing 3.

As mentioned above, the unit or apparatus 1 is specifically designed to be relatively small (e.g., 8×8×16 feet inclusive of the housing 3 and its exterior air and water inlets and outlets and weigh on the order of 12,000 pounds) so it can be portable and deployable (e.g., plumbed) wherever needed or desirable along the municipal water distribution system. Normally, this is spaced from and outside of the main water storage reservoirs or tanks of the city which are typically fixed in place and very large (e.g., 20-35 feet high and 30-100 feet wide holding 150,000 to 2,000,000 or more gallons). In this manner, the THM stripping process of the unit 1 can be strategically placed almost anywhere in the municipal water distribution system as needed. This would include downstream of a boost or recharging station of chorine creating an increase in liquid state THM in the water or just anywhere along the distribution system that undesirably high THM readings are detected or occur for whatever reason. Also, as the city expands its distribution system to cover new areas or handle more volume that does not justify the time and cost of building a large, fixed-in-place tank or reservoir or where space to do so is not available, one or more units 1 of the present invention can be deployed to handle any THM problems that may need to be met. Further, because of the relatively small size of the unit 1, the unit 1 can be installed fairly quickly virtually anywhere it is convenient. The serpentine water and air flow paths through the housing 3 as discussed above contribute to the relatively small but effective size of the treatment unit 1.

The relatively small size of the unit 1 also enables it to be placed in an existing structure which can be very advantageous in colder climates particularly if the structure is heated. Such heating among other things can avoid potential problems from frozen pipes and freezing water in addition to favorably providing heated air to the housing 3 to enhance the volatization process within the housing 3 of the liquid THM. To the extent the treatment unit 1 is placed in an existing structure or is otherwise not in an outside, stand-alone configuration, the air inlet arrangement preferably draws in fresh ambient air entering or in the existing structure. The air outlet arrangement then preferably discharges the mixed air and THM in gaseous state 31 out of the housing 3 through the air outlet duct portion 29 to ambient air at a location outside of the existing structure and away from the air inlet arrangement so as not to contaminate the incoming ambient air. Similarly and even in a standalone configuration, the locations of the drawn-in ambient air 8 and discharged mixed air and THM in gaseous state 31 are preferably spaced well from each other to avoid contamination. In any operating environment, there is then preferably a continuous air flow from ambient or atmospheric air surrounding the housing 3 (i.e., outside of the housing 3 or any structure it is in) through the housing 3 and back out to ambient air.

Whether the unit 1 is in an existing structure or not, periodic maintenance and inspection of the unit 1 is extremely easy and safe to perform as it is normally at ground level and all of the working components (e.g., spray nozzles, pumps, and controls) are outside of the housing 3. Repair people then need not climb up the unit 1 as they would if it were a 20-35 foot or higher tank nor do they need to enter the treatment area within the housing 3 as is usually required with large, fixed-in-place municipal tanks in which many or most of the working components needing inspection and repair are actually inside the tank. For such entry, many states and cities require special, elaborate, and costly training and that strict regulatory and other safety procedures be followed. Special equipment must also often be used such as winches to lower the workers, tethered tools, safety lines, air monitors, inflatable rafts, and even diving gear as well as rescue personnel standing by. Avoiding such entry as in the design of the present treatment unit 1 is very advantageous. Further, the unit 1 of the preferred embodiment preferably induces the air flow through the housing 3 as discussed above without the need and expense of a powered blower (although one could be used if desired).

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the undesirable byproducts to be treated by the present invention have been primarily described as being trihalomethanes (THM) resulting from disinfecting processes that use chlorine and chloramines. Such THM exist in liquid state in the processed water and have a relatively high vapor pressure while having a relatively low aqueous solubility. Consequently, THM in liquid state in water easily and quickly volatizes to a gaseous state when exposed to air. However, the apparatus of the present invention is meant to equally encompass treating similar byproducts from other disinfecting processes in which the processed water has undesirable byproducts with similar properties to THM including a relatively high vapor pressure so it easily and quickly volatizes into air. It is also noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

We claim:

1. A self-regulating apparatus automatically operable in at least two modes for treating water laden with trihalomethanes (THM) in liquid state in a pipeline under substantially constant line pressure above atmospheric and flowing at fluctuating flow rates through said pipeline, said self-regulating apparatus including:

a housing having a water inlet arrangement in fluid communication with the water in said pipeline at a first location along said pipeline and a water outlet arrangement in fluid communication with the pipeline at a second location along said pipeline, said housing having a ceiling, floor, and a side wall portion extending substantially about a central vertical axis between the ceiling and floor to collect water therein with the surface of the collected water spaced below the ceiling of the housing to create an air gap region between the ceiling and the surface of the collected water therebelow, said housing further including an air inlet arrangement and an air outlet arrangement, said air inlet arrangement having a portion thereof positioned above the surface of the collected water in the housing and in fluid communication with ambient air surrounding the housing and with the air gap region of the housing and said air outlet arrangement having a portion thereof spaced from the air inlet portion and positioned above the surface of the collected water in the housing and in fluid communication with the air gap region of the housing and the ambient air surrounding the housing, said water inlet arrangement for said housing spraying incoming water laden with THM in liquid state from the first location along said pipeline substantially at a first flow rate into the air gap region of the housing above the surface of the collected water therein, said portion of the air inlet arrangement being positioned adjacent said water inlet arrangement wherein ambient air passes into the housing through said air inlet portion into the spray exposing the THM in liquid state in said spray to air and volatizing the THM in liquid state to a gaseous state in the air gap region, said air and gaseous state THM in said air gap region above the surface of the collected water in said housing then passing out of the housing through the portion of the air outlet arrangement into the ambient air surrounding the housing with the remaining sprayed water adding to the collected water in the housing, said self-regulating apparatus further including a pump arrangement to discharge part of the collected water from the housing below the surface of the collected water therein into the pipeline at said second location substantially at a first discharge flow rate substantially matching the first discharge rate of the water inlet arrangement to maintain the collected water in the housing substantially at a first depth, said pipeline having an open section extending between the first and second locations thereof bypassing the housing wherein water in the pipeline can automatically flow from the first location to the second location in at least two modes (a) with substantially all of the flow in the pipeline passing from the first location of the pipeline to the second location of the pipeline through the housing in a first mode to be treated when the fluctuating flow rate in the pipeline upstream of the first location is substantially equal to or less than the first discharge flow rate of said pump arrangement and (b) with only a portion of the flow in the pipeline passing form the first location through the housing to the second location to be treated and the rest of the flow in the pipeline passing directly from the first location through the open bypass section of the pipeline to the second location thereof in a second mode when the fluctuating flow rate in the pipeline upstream of the first location is greater that the first discharge flow rate of the pump arrangement, said fluctuating flow rate in said pipeline automatically determining whether the self-regulating apparatus operates in said first or second mode.

2. The apparatus of claim 1 wherein said water inlet arrangement includes at least one nozzle to spray the incoming water laden with THM in liquid state into the air gap region of the housing.

3. The apparatus of claim 1 wherein said water inlet arrangement includes at least one nozzle to spray the incoming water laden with THM in liquid state along a first substantially horizontal path into the air gap region of the housing wherein ambient air surrounding the housing passes through the air inlet arrangement of the housing into the spray to contact and volatize the THM in liquid state in the spray to said gaseous state in the air gap region and drives said air and gaseous THM in the air gap region out of the housing through the air outlet arrangement thereof into the ambient air surrounding the housing.

4. The apparatus of claim 3 wherein said nozzle is positioned adjacent a first section of the side wall portion of the housing and said spray from the nozzle is directed along said first substantially horizontal path toward a second section of the side wall portion substantially opposite the first section about the central vertical axis of the housing, said apparatus further including a splash plate positioned in the air gap region along said first path adjacent the second section of the side wall portion of the housing wherein the spray from the nozzle and ambient air therein from the air inlet portion of the housing strike the splash plate to aid in separating the air and gaseous THM from the spray, said air and gaseous THM passing out of the housing through the air outlet portion of the housing into the ambient air surrounding the housing.

5. The apparatus of claim 4 wherein the spray from the nozzle draws the ambient air through the air inlet portion of the housing into the spray.

6. The apparatus of claim 4 wherein said spray directed along said first path strikes said splash plate and at least a portion thereof is redirected by said splash plate along a second path substantially opposite to said first path.

7. The apparatus of claim 6 further including a ramp downwardly inclined from said splash plate and extending substantially along said second path to receive and guide water from said spray striking said splash plate to the collected water in the housing below the air gap region.

8. The apparatus of claim 7 wherein the ramp guides the water thereon to a location in the air gap region adjacent the first section of the side wall portion of the housing and into the collected water in the housing adjacent the first section and below the air gap region.

9. The apparatus of claim 8 wherein the pump arrangement has an upwardly inclined inlet pipe extending from an entrance positioned in the collected water in the housing adjacent the floor of the housing and adjacent the second section of the side wall portion of the housing opposite the first wall section.

10. The apparatus of claim 8 wherein the air in the air gap region contacts THM in liquid state in the water on the ramp to volatize the THM in liquid state to a gaseous state, said gaseous THM passing out of the housing with the air in the air gap region through the air outlet arrangement of the housing into the ambient air surrounding the housing.

11. The apparatus of claim 4 wherein the splash plate includes a substantially concave section facing the spray directed along said first path.

12. The apparatus of claim 3 further including a duct surrounding the spray from the nozzle, said duct extending from adjacent the first section of the side wall portion of the housing to an end location along said first path spaced from the splash plate, said spray directed along said first path from the nozzle being contained within the duct to said end location thereof, said spray leaving the duct at the end location thereof striking the splash plate and being redirected along a second path substantially opposite the first path and outside of said duct, said duct adjacent the first section of the side wall portion being in fluid communication with the air inlet portion of the housing wherein ambient air surrounding the housing passes into the housing and into the duct through the air inlet portion and into the spray in the duct.

13. The apparatus of claim 12 wherein the end location of the duct is spaced a first distance along the first path from said splash plate and said air outlet portion of the housing has an entrance in fluid communication with said air gap region outside of said duct and spaced farther from the splash plate than said first distance wherein air and gaseous THM exiting the duct at said end location and striking the splash plate travel along a path substantially opposite to the first path to exit the housing through the entrance to the air outlet portion and out to ambient air surrounding the housing.

14. The apparatus of claim 1 wherein said water inlet arrangement includes at least one nozzle to spray the incoming water laden with THM in liquid state into the air gap region of the housing wherein the spray draws ambient air surrounding the housing through the air inlet arrangement of the housing into the spray to contact and volatize the THM in liquid state in the spray to said gaseous state in the air gap region and drives the air and gaseous THM in the air gap region out of the housing through the air outlet arrangement thereof into the ambient air surrounding the housing wherein the line pressure in said pipeline upstream of the first location is the sole motive force to drive the incoming water through the nozzle, to draw the ambient air through the air inlet portion of the housing into the spray, and to drive the air and gaseous THM in the air gap region out of the housing through the air outlet arrangement thereof into the ambient air surrounding the housing.

15. An apparatus for treating water laden with trihalomethanes (THM) in liquid state in a pipeline, said apparatus including:

a housing having a water inlet arrangement in fluid communication with the water in said pipeline at a first location along said pipeline and a water outlet arrangement in fluid communication with the pipeline at a second location, said housing having a ceiling, floor, and a side wall portion extending substantially about a central vertical axis between the ceiling and floor to collect water therein with the surface of the collected water spaced below the ceiling of the housing to create an air gap region between the ceiling and the surface of the collected water therebelow, said housing further including an air inlet arrangement and an air outlet arrangement, said air inlet arrangement having a portion thereof positioned above the surface of the collected water in the housing and in fluid communication with ambient air surrounding the housing and with the air gap region of the housing and said air outlet arrangement having a portion thereof spaced from the air inlet portion and positioned above the surface of the collected water in the housing and in fluid communication with the air gap region of the housing and the ambient air surrounding the housing, said water inlet arrangement for said housing spraying incoming water laden with THM in liquid state from the first location along said pipeline substantially at a first flow rate into the air gap region of the housing above the surface of the collected water therein, said portion of the air inlet arrangement being positioned adjacent said water inlet arrangement wherein ambient air passes into the housing through said air inlet portion into the spray exposing the THM in liquid state in said spray to air and volatizing the THM in liquid state to a gaseous state in the air gap region, said air and gaseous state THM in said air gap region above the surface of the collected water in said housing then passing out of the housing through the portion of the air outlet arrangement into the ambient air surrounding the housing with the remaining sprayed water adding to the collected water in the housing, said apparatus further including a pump arrangement to discharge part of the collected water from the housing below the surface of the collected water therein into the pipeline at said second location substantially at a first discharge flow rate substantially matching the first discharge rate of the water inlet arrangement to maintain the collected water in the housing substantially at a first depth.

16. The apparatus of claim 15 wherein said water inlet arrangement includes at least one nozzle to spray the incoming water laden with THM in liquid state along a first substantially horizontal path into the air gap region of the housing wherein the spray from the nozzle draws ambient air surrounding the housing through the air inlet arrangement of the housing into the spray to contact and volatize the THM in liquid state in the spray to said gaseous state in the air gap region and drives said air and gaseous THM in the air gap region out of the housing through the air outlet arrangement thereof into the ambient air surrounding the housing to create a continuous air flow through the housing.

17. The apparatus of claim 16 wherein said nozzle is positioned adjacent a first section of the side wall portion of the housing and said spray from the nozzle is directed along said first substantially horizontal path toward a second section of the side wall portion substantially opposite the first section about the central vertical axis of the housing, said apparatus further including a splash plate positioned in the air gap region along said first path adjacent the second section of the side wall portion of the housing wherein the spray from the nozzle and ambient air therein from the air inlet portion of the housing strike the splash plate to aid in separating the air and gaseous THM from the spray, said air and gaseous THM passing out of the housing through the air outlet portion of the housing into the ambient air surrounding the housing.

18. The apparatus of claim 17 wherein the spray from the nozzle draws the ambient air through the air inlet portion of the housing into the spray.

19. The apparatus of claim 17 wherein said spray directed along said first path strikes said splash plate and at least a portion thereof is redirected by said splash plate along a second path substantially opposite to said first path.

20. The apparatus of claim 19 further including a ramp downwardly inclined from said splash plate and extending substantially along said second path to receive and guide water from said spray striking said splash plate to the collected water in the housing below the air gap region.

21. The apparatus of claim 20 wherein the air in the air gap region contacts THM in liquid state in the water on the ramp to volatize the THM in liquid state to a gaseous state, said gaseous THM passing out of the housing with the air in the air gap region through the air outlet arrangement of the housing into the ambient air surrounding the housing.

22. The apparatus of claim 20 wherein the ramp guides the water thereon to a location in the air gap region adjacent the first section of the side wall portion of the housing and into the collected water in the housing adjacent the first section and below the air gap region.

23. The apparatus of claim 17 wherein the pump arrangement has an upwardly inclined inlet pipe extending from an entrance positioned in the collected water in the housing adjacent the floor of the housing and adjacent the second section of the side wall portion of the housing opposite the first wall section.

24. The apparatus of claim 17 wherein the splash plate includes a substantially concave section facing the spray directed along said first path.

25. The apparatus of claim 16 further including a duct surrounding the spray from the nozzle, said duct extending from adjacent the first section of the side wall portion of the housing to an end location along said first path spaced from the splash plate, said spray directed along said first path from the nozzle being contained within the duct to said end location thereof, said spray leaving the duct at the end location thereof striking the splash plate and being redirected along a second path substantially opposite the first path and outside of said duct, said duct adjacent the first section of the side wall portion being in fluid communication with the air inlet portion of the housing wherein ambient air surrounding the housing passes into the housing and into the duct through the air inlet portion and into the spray in the duct.

26. The apparatus of claim 25 wherein the end location of the duct is spaced a first distance along the first path from said splash plate and said air outlet portion of the housing has an entrance in fluid communication with said air gap region outside of said duct and spaced farther from the splash plate than said first distance wherein air and gaseous THM exiting the duct at said end location and striking the splash plate travel along a path substantially opposite to the first path to exit the housing through the entrance to the air outlet portion and out to ambient air surrounding the housing.

27. The apparatus of claim 15 wherein said water inlet arrangement includes at least one nozzle to spray the incoming water laden with THM in liquid state into the air gap region of the housing wherein the spray draws ambient air surrounding the housing through the air inlet arrangement of the housing into the spray to contact and volatize the THM in liquid state in the spray to said gaseous state in the air gap region and drives the air and gaseous THM in the air gap region out of the housing through the air outlet arrangement thereof into the ambient air surrounding the housing wherein the line pressure in said pipeline upstream of the first location is the sole motive force to drive the incoming water through the nozzle, to draw the ambient air through the air inlet portion of the housing into the spray, and to drive the air and gaseous THM in the air gap region out of the housing through the air outlet arrangement thereof into the ambient air surrounding the housing.

28. The apparatus of claim 15 wherein said pipeline has an open section extending between the first and second locations thereof bypassing the housing.

29. The apparatus of claim 15 wherein the water in the pipeline has a substantially constant line pressure above atmospheric and the water flows through the pipeline at fluctuating flow rates, said pipeline further having an open section extending between the first and second locations thereof bypassing the housing wherein water in the pipeline can automatically flow from the first location to the second location in at least two modes (a) with substantially all of the flow in the pipeline passing from the first location of the pipeline to the second location of the pipeline through the housing in a first mode to be treated when the fluctuating flow rate in the pipeline upstream of the first location is substantially equal to or less than the first discharge flow rate of said pump arrangement and (b) with only a portion of the flow in the pipeline passing form the first location through the housing to the second location to be treated and the rest of the flow in the pipeline passing directly from the first location through the open bypass section of the pipeline to the second location thereof in a second mode when the fluctuating flow rate in the pipeline upstream of the first location is greater that the first discharge flow rate of the pump arrangement, said fluctuating flow rate in said pipeline automatically determining whether the apparatus operates in said first or second mode.

\* \* \* \* \*